United States Patent [19]

Bryan et al.

[11] Patent Number: 5,561,468
[45] Date of Patent: Oct. 1, 1996

[54] MULTIPLEXED MODULATION SYSTEM FOR ROBUST AUDIO DIGITAL TELEVISION

[75] Inventors: David A. Bryan, Danbury, Conn.; Samir N. Hulyalkar, White Plains, N.Y.; Carlo Basile, Ossining, N.Y.; Zhi-Yuan Guan, Croton-On-Hudson, N.Y.

[73] Assignee: North American Philips Corporation, New York, N.Y.

[21] Appl. No.: 396,289

[22] Filed: Feb. 28, 1995

Related U.S. Application Data

[63] Continuation of Ser. No. 60,181, May 7, 1993, abandoned.

[51] Int. Cl.$^6$ ................................. H04N 11/06
[52] U.S. Cl. ..................... 348/469; 348/473; 370/20; 370/84; 370/104.1; 375/261
[58] Field of Search ...................... 348/394, 469, 348/471, 488, 473, 466, 465, 467; 375/39, 98, 106; 370/110.4, 20, 84; H04N 11/06, 5/38, 5/52

[56] References Cited

U.S. PATENT DOCUMENTS

| | | | |
|---|---|---|---|
| 4,775,988 | 10/1988 | Chevillat et al. | 375/98 |
| 4,891,806 | 1/1990 | Farias et al. | 370/110.1 |
| 5,235,424 | 8/1993 | Wagner et al. | 358/177 |
| 5,267,021 | 10/1993 | Ramchandran et al. | 358/12 |

FOREIGN PATENT DOCUMENTS

| | | |
|---|---|---|
| 0490552 | 2/1991 | European Pat. Off. . |
| 9222162 | 10/1992 | WIPO . |

OTHER PUBLICATIONS

QAM: The Modulation Scheme for Future Mobile Radio Communications; W. T. Webb Electronics & Communication Journal; vol. 4, No. 4, Aug. 1992, London GB pp. 167–176.

P. G. M. de Bot, "Multiresolution Transmission for digital Terrestrial Television Broadcasting", Aug. 31, 1992, Philips Electronics B.V., Eindhoven, The Netherlands, pp. 1–8.

A. Milewski, "Periodic Sequences with Optimal Properties for Channel Estimation and Fast Start–Up Equalization", IBM J. Res. Develop, vol. 27, No. 5, Sep. 1983, pp. 426–431.

P. R. Chevillat et al., "Rapid Training of a Voiceband Data–Modem Receiver Employing an Equalizer with Fractional–T Spaced Coefficients", IEEE Transactions on Comm., vol. COM–35, No. 9, Sep. 1987, pp. 869–876.

Primary Examiner—Victor R. Kostak
Assistant Examiner—Nathan J. Flynn
Attorney, Agent, or Firm—Michael E. Marion

[57] ABSTRACT

A method and apparatus for transmitting a digital television signal using a single QAM (quadrature amplitude modulated) carrier which provides audio and video data packets at respective complex symbol data rate levels. One purpose of the invention is to provide a digital television signal which resembles the audio vs. video reception characteristics exhibited by conventional analog television (i.e. NTSC). way communication path.

21 Claims, 5 Drawing Sheets

DIRECTION OF DATA STREAM

16 POINT SIGNAL STRUCTURE AND SUBSET A B C D OF STATES USED FOR 4 QAM AND FOR TRAINING

32 POINT SIGNAL STRUCTURE AND STATES A B C D USED FOR 4 QAM AND FOR TRAINING

MULTIPLEXED MODULATION SYSTEM FOR ROBUST AUDIO DIGITAL TELEVISION

This is a continuation of application Ser. No. 08/060,181, filed May 7, 1993, now abandoned.

BACKGROUND OF THE INVENTION

The Federal Communications Commission and cable television testing organizations such as Cable Labs, have been evaluating digital television delivery systems in order to choose a new television "standard" which someday will replace NTSC in the United States. These systems all involve digital coding and data compression techniques, for example those utilizing the MPEG algorithm or variations thereof. Such systems utilize other digital compression schemes, for example MUSICAM, to digitally code audio. MPEG is discussed in U.S. Ser. No. 774,006, filed Oct. 8, 1991 which is incorporated by reference herein.

Several systems, such as those demonstrated by the Advanced Television Research Consortium and the American Television Alliance, propose using quadrature amplitude modulation (QAM) in the transmission of the coded television information. QAM has demonstrated robust performance during the tests conducted by the ATTC (Advanced Television Testing Committee).

Conventional analog broadcasts (i.e. NTSC) provide the audio portion of the television signal as a frequency modulated signal while using amplitude modulation for the video signal. One desirable feature of NTSC is that a relatively clear audio signal can be received even when the video signal is marginally viewable.

Certain digital television systems, for example the DIGICIPHER system proposed by the American Television Alliance, utilize a single quadrature amplitude modulated carrier to provide both video data and audio data. An undesirable characteristic of such single carrier systems however, is that there is no gradual roll off in signal reception as with NTSC. Instead reception tends to abruptly "cut off" once the receiver-to-transmitter distance reaches the point where error correction and concealment processes cannot accurately compensate for the increased BER (bit error rate) and reduced C/N (carrier to noise).

One goal of another of the proposed digital television systems is to provide a transmitted television signal which imitates the gradual reduction in overall reception quality provided by conventional television signals. Toward this end, the Advanced Television Research Consortium has proposed quadrature amplitude modulating two separate carriers with separate data streams having different priority levels. One data stream provides video and audio information necessary to receive a "basic" television signal, and is transmitted on a first QAM carrier having the more robust transmission characteristic. A second data stream comprising information which provides the additional data necessary to receive the full HDTV signal is transmitted on a second QAM carrier having a transmission characteristic which is less robust. The aim of this prioritized transmission scheme is to provide for signal performance quality which would degrade gradually, rather than drop off abruptly with distance. The distinction between the gradual degradation between audio and video is incidental however since either (or both) data streams can comprise audio information as well as video. The twin QAM carrier approach is also more complex than single carrier QAM systems which do not try to emulate the gradual performance characteristics of conventional television signal.

It is therefore one object of the instant invention, to provide a single carrier QAM television signal which emulates the reception characteristics exhibited by audio and video in conventional analog television systems.

In an article entitled "Multiresolution Transmission for Digital Terrestrial Television Broadcasting", which is available from Philips Electronics, B. V., Eindhoven, the Netherlands, Paul G. M. de Bot describes multiresolution QAM techniques to enable the transmission of different levels of video using multiresolution signal constellations. De Bot discusses why this technique is preferred over the technique of time-division multiplexing different QAM constellations. In his article however, De Bot notes that an advantage of time-division multiplexing different QAM constellations is that any ratio of data rates can be used and the ratio can easily be changed during transmission as long as the total data stream data rate remains constant. De Bot does not however, discuss the advantages, or problems associated with, the use of multiresolution signal constellations or time-division multiplexing of different constellations to prioritize the transmission of audio separate from, and with respect to, video portions of a television signal.

In digital data transmission systems information is coded into data bits and a modem transmitter encodes groups of bits into symbols for transmission at a prescribed signaling rate. The analog transmission channels usually introduce linear amplitude and phase distortion to the transmitted signal as well as multipath. This distortion can cause an overlap of received symbols known as intersymbol interference (ISI). Such distortion can be compensated for by using an adaptive digital equalizer in the modem receiver to eliminate ISI caused by channel impairments. These equalizers require rapid, accurate and dependable estimation of the characteristics of the transmission channel in order to provide for fast start-up equalization.

The CCITT V.33 standard for point-to-point telephone modems described in the CCITT Recommendation V.33 "14,400 Bits Per Second Modem Standardized For Use On Point-To-Point 4-Wire Leased Telephone-Type Circuits" (Melbourne, 1988), incorporated by reference herein, describes a pseudo random noise (PN) training sequence preceded by a two point alternation sequence for a duration of 256 symbol intervals. The detection of the alternation sequence serves to detect the training sequence adjacent to it. The length of the CCITT alternation and training sequence combination is relatively long, but this poses no problem in telephone systems (or other dedicated two-way systems which inherently contain a "feed-back" loop for maintaining synchronization), because the alternation and training sequences are transmitted in burst fashion when communication commences and do not have to be frequently repeated. In television transmission systems however, where no "feed-back" loop exists, and where the television viewer may frequently tune among a number of simultaneously transmitted QAM signals, the CCITT alternation sequence and PN training sequence combination is too long for practical use. Another object of the invention is therefore, to provide an alternation sequence and training sequence suitable for use in television transmission systems.

SUMMARY OF THE INVENTION

As opposed to the fixed ratio provided by the multiresolution constellation techniques elaborated upon by de Bot, which can only provide a fixed ratio of data rates, the time-multiplexing of different QAM constellations can provide a much more suitable ratio of data rates which can be optimized for the object of the invention stated above, i.e., the use of different QAM constellations for audio and video data, respectively.

A feature of a preferred embodiment of the invention, is the time multiplexing of audio and video packets using corresponding lower and higher levels of QAM, for example a "lower" level of 16 QAM for audio packets and a "higher" level of 32 QAM for video packets. Because the "lower" QAM level provides a lower BER than the "higher" QAM level, for the same C/N performance, a more robust audio signal is provided, with respect to the video packets transmitted at the "higher" level, thereby achieving audio vs. video reception characteristics which resemble those provided by NTSC.

Another feature of the preferred embodiment of the invention, is to provide a system for detecting, at a receiver, the modulation level at which the transmitted signal is currently being sent, at any given time.

The preferred embodiment of the invention comprises the use of a "header" preceding the data portion of each packet within the stream of symbols comprising the transmitted data. Each header includes an alternation sequence and a rate sequence which indicates the modulation level of the immediately following data portion of a packet. The header can also include a training sequence for training an equalizer at the receiver. In between certain headers, additional data packets are provided which are preceded only by a rate sequence which is used to identify the respective modulation level of the respective data portion of the packet.

The alternation sequences are used to achieve synchronization of the received stream of data packets by enabling the detection of the training sequence at the receiver using simple implementation. Once an alternation sequence is detected at the receiver, the receiver is able to count the symbols making up the received signal and thereby keep track of the packet boundaries and the respective rate sequences. The number of symbols making up each data packet can either be a fixed number, or be a variable number represented by a packet length indicator which can be part of the respective packet.

The alternation and training sequences are sent periodically and the period between two sequences is short enough to rapidly synchronize and train the receiver each time the receiver is re-tuned (i.e. each time a different television channel is selected by the viewer).

The embodiments discribed herein relate to transmission systems designed for terrestrial broadcasting. It should be noted however, that the invention is not limited to such systems and can equally be used in cable, microwave, DBS and recording/playback systems as well. "Transmission" as defined herein, is therefore intended to encompass all forms of transmission/reception and/or recording/playback.

DETAILED DESCRIPTION OF PREFERRED EMBODIMENTS OF THE INVENTION

Figure 1:
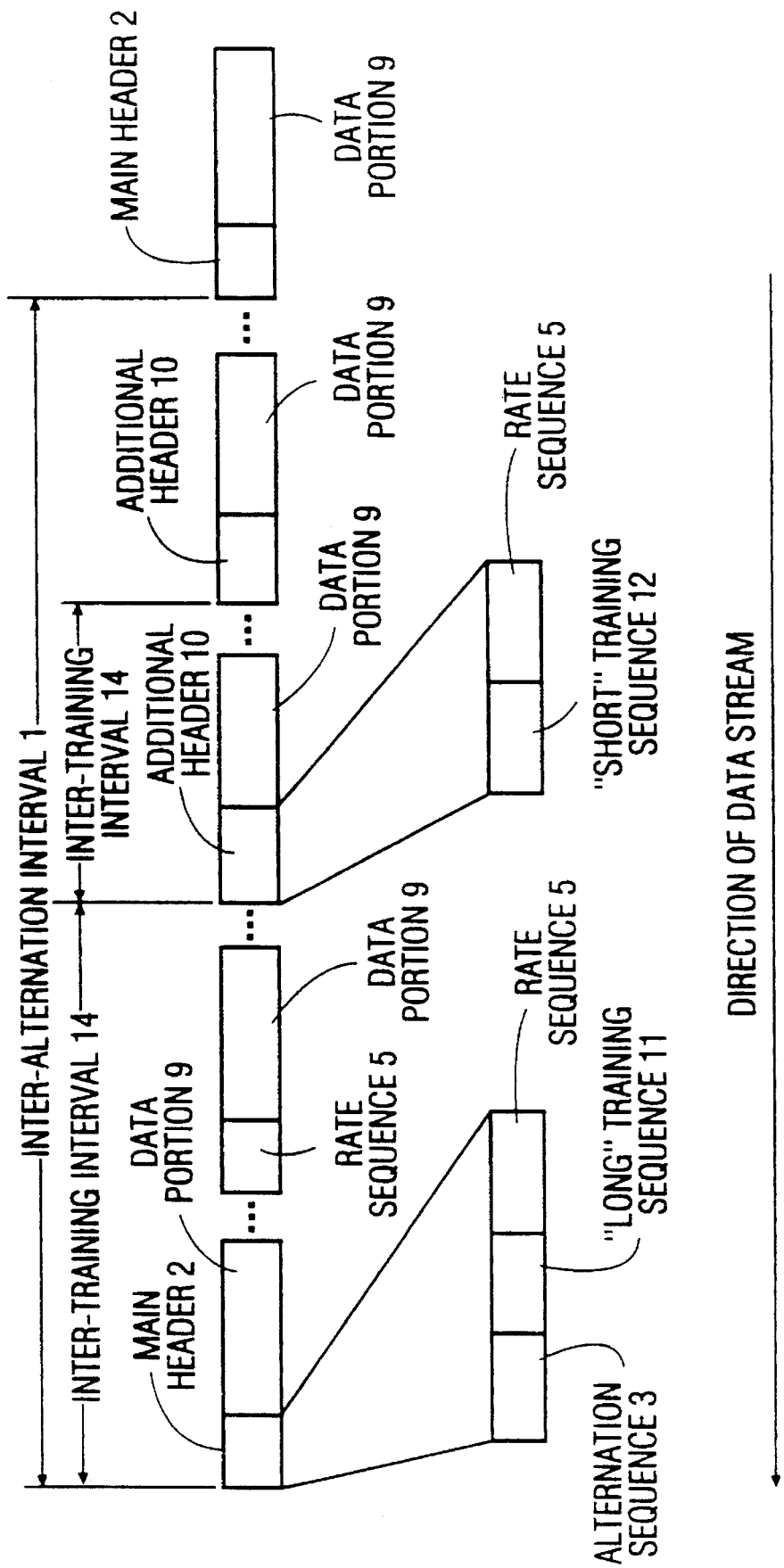
FIG. 1 describes a data stream formatted in accordance with the invention.

Although a main feature of the invention described herein is the transmission of audio and video data packets using respective QAM modulation levels in a time multiplexed format, the structure of the stream of transmitted data, as shown in FIG. 1, exemplifies other embodiments of the invention as well.

A data stream in the form of data packets, including audio and video information packets, are shown during an inter-alternation interval 1. The inter-alternation interval, as defined herein, is the portion of the data stream which begins with a main header 2 and ends with the data portion of the packet 9 before the next main header 2.

It is to be understood that each data potion of the packet 9 can comprise either audio or video information, or a combination of both, but is not limited to this type of data. It is to be understood that digital data carrying information with different degrees of priority (i.e. need for robustness) can be contained in respective data portions of packets, each with a rate sequence defining its signal constellation appended thereto. It should further be understood that sequence as defined herein denotes a sequence of bits which can represent one or more pieces of data and/or a digital code word.

Each main header 2 comprises an alternation sequence 3, a "long" training sequence (described below) and a rate sequence 5. Each rate sequence 5 indicates the QAM signal constellation (either 16 QAM or 32 QAM, for example) which is used to modulate the following data portion of the packet (e.g. audio or video). The modulation level (signal constellation) assigned to each rate sequence 5 itself is always the same, for example 4 QAM (also known as QPSK).

Data portions 9 are also disposed within the inter-alternation interval 1 between headers, adjacent only to a rate sequence 5.

The alternation sequence 3 of each main header 2 serves as a high level multi-packet synchronization scheme. When synchronization to the alternation sequence 3 is achieved at the receiver, the receiver is able to determine the boundaries of the following training and rate sequences and the length of their adjacent data portions, by simple counting of symbols due to either fixed length groups of symbols, or group length information included as part of each respective sequence or data portion.

Because the alternation and training sequences are transmitted periodically, a similar alternation sequence than that described by the CCITT for use in point-to-point telephone modems, can be used in the preferred embodiment as alternation sequence 3.

The preferred embodiment of the invention described herein utilizes training signals which exhibit a constant amplitude and zero autocorrelation. These training signals are known in the art as CAZAC sequences.

In a paper by A. Milewski (pp.426–431) entitled "Periodic Sequences with Optimal Properties for Channel Estimation and Fast Start-Up Equalization", IBM Journal of Research and Development, September 1983, the author describes the advantages associated with periodic CAZAC sequences. This paper is incorporated by reference herein.

CAZAC sequences require very little overhead and exhibit improved performance for fast start-up equalization as compared to "maximal-length" sequences such as the PN sequence described in by the CCITT standard. Milewski does not however, discuss the use of alternation sequences in conjunction with CAZAC sequences since he focuses on the problem of detection of the training sequence.

In a paper published in the IEEE Transactions On Communications, September, 1987, by Chevillat, Maiwald and Ungerboeck (pp.869–875) entitled "Rapid Training of a Voiceband Data-Modem Receiver Employing and Equalizer with Fractional-T Spaced Coefficients", which is incorportated by reference herein, a method is proposed which used the CAZAC sequence to perform the initial detection which is more complex than using an alternation sequence to implement such detection. Furthermore, the reliability of detection is higher using an alternation sequence which is important for one way communication systems.

The use of periodic CAZAC training sequences in a one-way data transmission system, such as the digital television system described herein, coupled with an alternation sequence for synchronization and packet detection, is one embodiment of the instant invention.

The "long" training sequence 11 is a CAZAC sequence which is disposed within the data stream periodically to ensure that receivers can always receive a training sequence within a short time after being powered up, or upon switching channels. Each "long" training sequence 11 is preceded by an alternation sequence 3. Each "long" training sequence 11 consists of K periods of a CAZAC sequence, where K is a real number, for example four. The length N of each repeated period is equal to, or longer than, the range of channel impulse response. N is normally set to a power of two to facilitate the analysis of the received sequence by a fast Fourier transform (FFT) in the receiver. The considerations involved in selecting K are described in Chevillat, et al. Factors involved in selecting the length N of the CAZAC sequence are discussed in Milewski.

Figure 3:
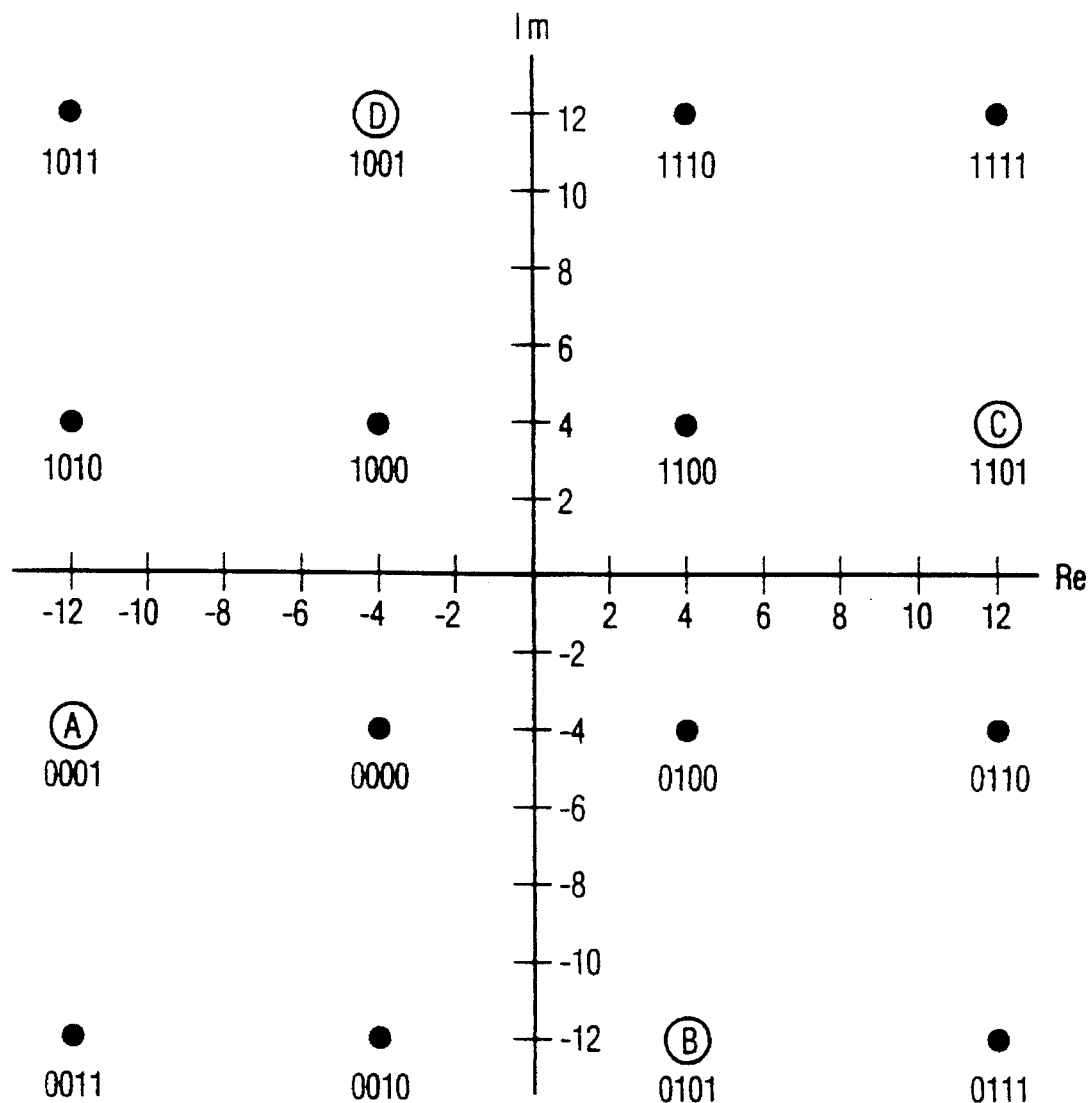
FIG. 3 illustrates a 16 point complex signal constellation used for 16 QAM.
Figure 4:
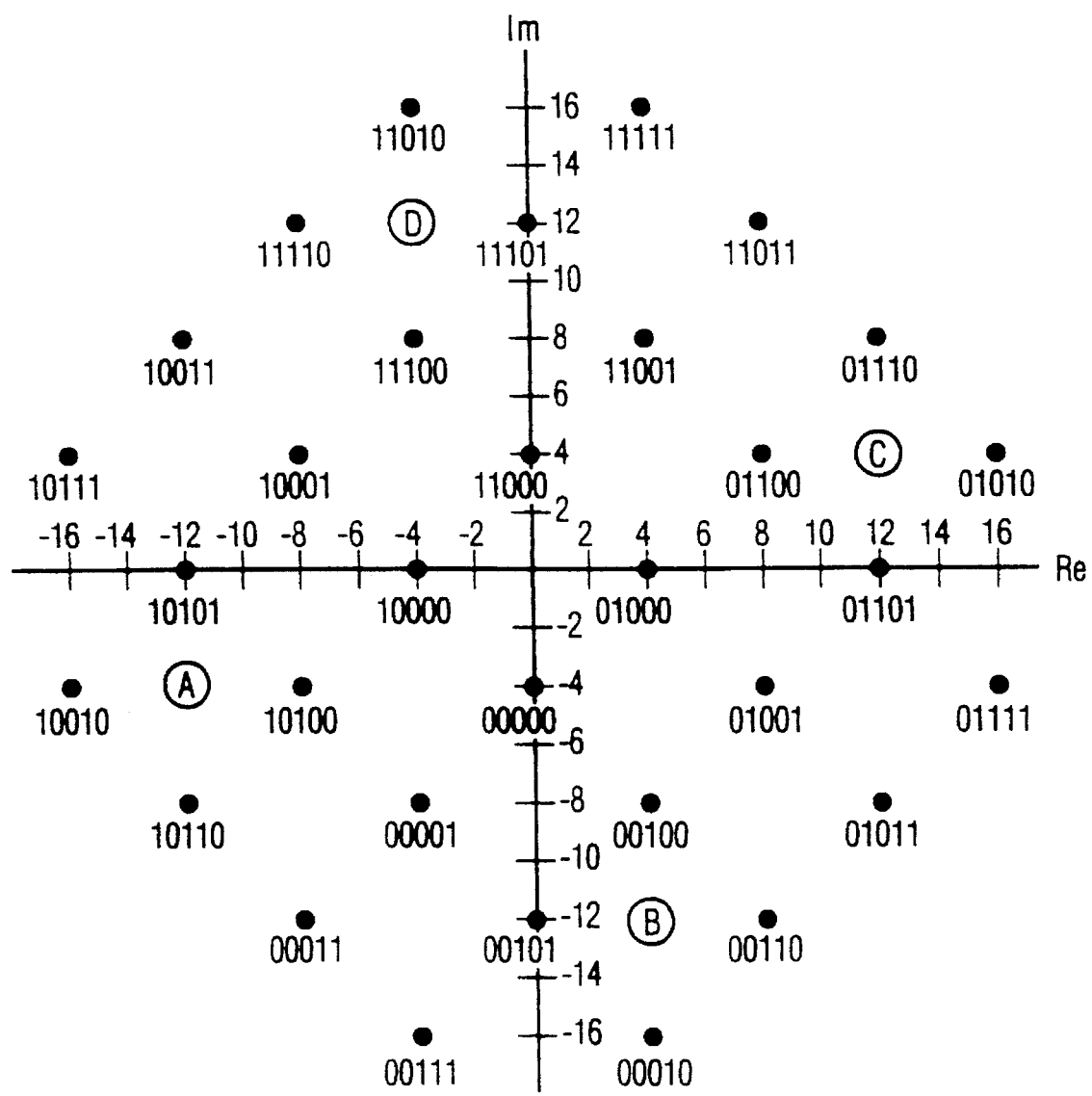
FIG. 4 illustrates a 32 point complex signal constellation used for 32 QAM.

All of the points in the CAZAC sequence are complex numbers with the same magnitude as shown in FIGS. 3 and 4. In the embodiments discussed herein, the CAZAC sequence comprises combinations of four points indicated on FIGS. 3 or 4, as A,B,C, and D.

Each "long" training sequence 11 in the embodiment described herein, consists of K CAZAC sequences each having a length of N, where K=4 and N=16. Each CAZAC sequence is, for example: ACACDABCCCCCBADC. Each "long" training sequence 11 therefore has a length equal to N*K, where N=16 and K=4, i.e. 64 symbols.

Although the use of a single "long" training signal 11 preceded by an alternation sequence 3, in each inter-alternation interval, represents one embodiment of the invention, the preferred embodiment of the invention, as shown in FIG. 1, comprises a data stream which comprises, in addition to the main header packet 2, additional headers 10 each comprising "short" training sequences 12. Like the "long" training sequence 11, each "short" training sequence comprises a number of CAZAC sequences each with a length N. The number of periods however, is half (K/2) of the number K chosen for the "long" training sequence 11.

The addition of a "short" training sequence is useful for example, to compensate for mismatch caused when multiple receivers are connected to a cable system tap through a splitter. For example, a digital set top converter which might be initially used to receive digital television broadcasts by converting them to NTSC would be coupled to an analog NTSC TV set by a splitter. The "return loss", or equivalently the amount of signal reflected by the tuner in the analog set varies tremendously and therefore the digital converter may see a significant variation in the channel characteristics due to coupling through the splitter,. This variation may occur so quickly that it cannot be tracked by the steady state adaptation mechanism of the demodulator in the set top converter. The demodulator's equalizer will therefore have to be re-initialized for the new channel characteristics and this can only happen after the demodulator receives the next training sequence. However it is not necessary to use the "long" training sequence 11 normally used to adapt during power up or channel flipping. We can assume that the demodulator timing and frequency synchronization is undisturbed, so that it is only necessary to send a shortened version of the training sequence (i.e. the "short" training sequence 12) to account for disturbances by other devices attached through splitters to the same cable.

Even with frequent training sequences it is possible that a burst of errors can occur during a channel disturbance, since tuner return loss changes can be nearly instantaneous. Through experimentation, it has been found that the number of data packets required for a typical "slice" of a digital television signal (comprising both audio and video data packets), coded for example in accordance with MPEG, is about 50. Usually a single packet error can cause an entire slice to be in error due to error propagation inherent in variable length coding. In the preferred embodiment, an inter-training interval 14 (i.e. the interval between the beginning of one header and the beginning of the next header, either main or additional headers) is chosen so that between headers, there is at most twenty five data packets containing video information (i.e. video data portions preceded only by rate sequences), which should cause at most 2 slices to be in error due to multiple packet errors.

Each alternation sequence 3 has a length of M symbols comprised of two of the points of the CAZAC sequence. M is normally selected to be less than, or equal to 2N. The two points are selected such that the distance between them is as large as possible. In the embodiment described herein, each alternation sequence 3 has a length M of 32 symbols comprising an alternation of A and C.

Figure 2:
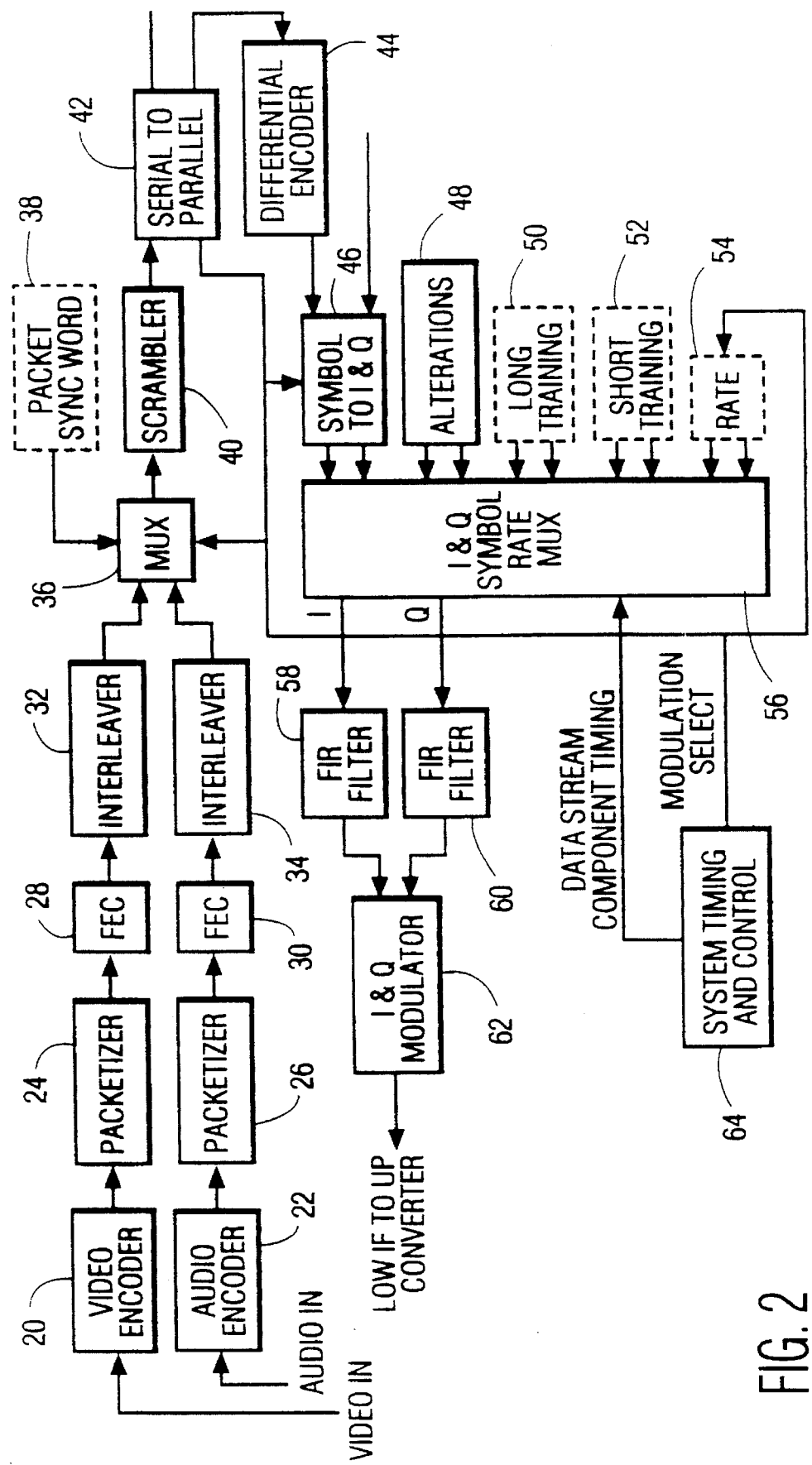
FIG. 2 is a block diagram of a transmitter incorporating the invention.

FIG. 2 shows a block diagram of a preferred embodiment of a transmitter in accordance with the invention. Audio and video are separately digitized in digital source encoders 20 and 22 and formed into packets in respective packetizers 24 and 26. Means for performing the encoding and packetizing and the other operations performed by the respective individual blocks of FIG. 2, are known in the art and will not therefore be described in detail herein. Forward error correction (FEC) codes, for example parity bytes from an RS GF ($2^8$) code, are appended to the respective audio and video data packets in FEC coders 28 and 30.

In order to make the FEC more effective in a burst-error environment, symbols of successive video and audio packets are interleaved in respective interleavers 32 and 34. With this approach, errors are spread over several consecutive FEC coded data packets rather than being contained within a single packet. The inclusion of interleavers enables use of higher rate FEC than would otherwise be required. Thus, after deinterleaving, error bursts that occur on the communication channel are spread out in the data sequence to be decoded and may span many received data packets.

A simple interleaver structure for block codes may be visualized as a rectangular array having I rows and n columns. Each element of the array is used to store one code symbol. Ordinarily, the size of a row, n, is the block length of the code used, so that each row contains one block. The vertical dimension of the array, I, is called the interleaving depth. It is common to refer to the entire array as an interleaving block. It can be seen that an error burst spanning 1<=I code symbols produces at most a single error in 1 consecutive blocks. Selection of I, therefore, depends on the expected burst length. At the receiving end, data is read into an I×n array by columns and out by rows.

The audio and video packets are separately interleaved in interleavers 32 and 34 respectively. The interleaving is separate since different modulation levels will be applied to the audio and video data packets.

Multiplexer 36 time multiplexes the audio and video data packets and may also insert a special binary packet. synchronization word 38, if desired. The output of multiplexer 36 then enters a scrambler 40, which is used to insure a uniform power spectrum in the transmitted signal. The serial output of the scrambler 40 is converted to a parallel word of, e.g., 2, 4, 5, or 6 bits to form a symbol of 4, 16, 32, or 64 QAM respectively, in serial to parallel converter 44. The two most significant bits of each symbol are differentially encoded in differential encoder 44 to allow decoding even with the inherent 90 degree phase ambiguity of the carrier recovery PLL in the receiver. Each differentially-encoded symbol is then converted to multi-bit I and Q constellation point values in symbol converter 46. Complex constellations for 16 and 32 QAM are given in FIGS. 3 and 4 respectively.

A symbol rate multiplexer 56 formats the data stream described in FIG. 1 by time multiplexing the alternation sequences 3 provided by alternation sequence generator 48, "long" training sequences 11 provided by "long" training sequence generator 50, "short" training sequences 12 provided by "short" training sequence generator 52, and rate sequences 55 provided by rate sequence generator 54, at the appropriate times according to the ordering shown in FIG. 1, under the control of the system timing and control circuit 64. It is logical to make the amount of data between training sequences equal to the number of FEC blocks in an FEC interleave block (FEC interleave depth) and thereby eliminate a separate sync word for FEC interleave boundaries (i.e., use the training sequences for FEC interleave sync). A separate FEC interleave sync word can also be included if desired.

The I and Q outputs of the symbol rate multiplexer 56 are applied through two identical FIR filters 58, 60, to a modulator 62 that translates the filtered I and Q signals to a passband signal (typically 2–8 MHz) at a low IF.

Choices of modulation levels for the alternation sequences, training sequences, rate sequences, and audio/video data packets are controlled by multiplexer 56, symbol to I and Q converter 46 and rate sequence generator 54 under the direction of the system timing and control circuit 64, which keeps track of the type of packet (e.g., audio or video) to be transmitted at any given time. System and timing control circuit 64 must also supply a timing control signal to multiplexer 56 to achieve the sequencing of multiplexed components (alternation, training, rate, data) as shown in FIG. 1. The detailed composition of system and timing control circuit 64 can be easily inferred by those skilled in the art of digital logic design.

Figure 5:
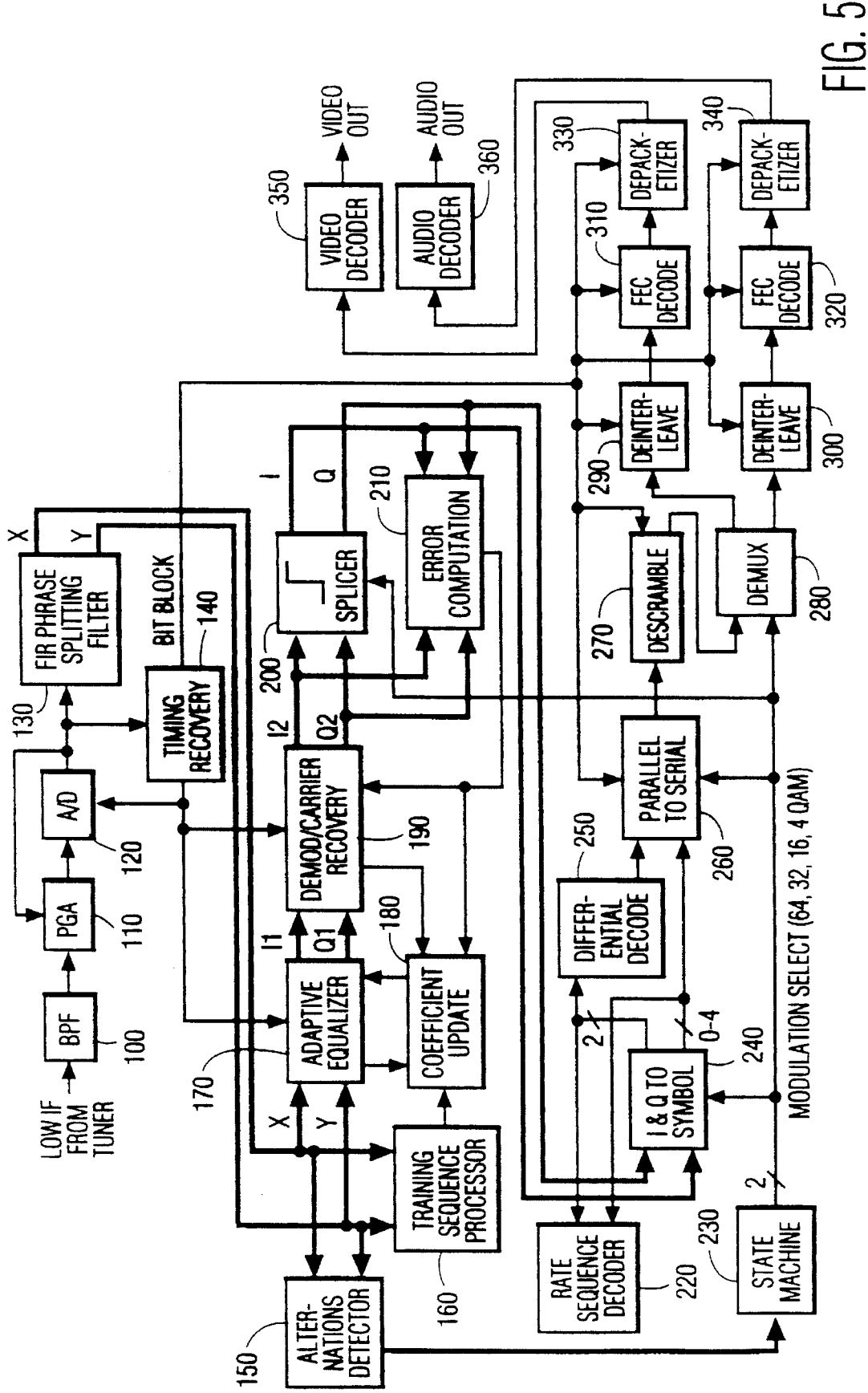
FIG. 5 is a block diagram of a receiver incorporating the invention.

FIG. 5 describes a preferred embodiment of a receiver comprising the invention. After transmission over a VHF/UHF terrestrial channel, for example, the multiplexed QAM signal is downconverted to a low IF (e.g., 5 MHz), by a tuner (not shown). A bandpass filter (BPF) 100, removes any residual mixing products and noise. A programmable gain amplifier (PGA) 110 forms part of an automatic gain control (AGC) loop that insures an optimal constant input level to the analog/digital converter (A/D) 120. The processing used to generate the control signal for the PGA is not described herein since it is well known in the art and is not germane to this disclosure. Phase splitting FIR filter 130 separates the real received signal into complex parts (X and Y). A training sequence processor 160 operates on the received "long" or "short" training sequences to produce an initial estimate of the correct filter coefficients for adaptive equalizer 170. The demodulator/carrier recovery block 190 performs a decision-directed demodulation of the signal to baseband, based on the error computed by error computation block 210. The output of error computation block 210 is a measure of the angular error between the raw Inphase (I) and Quadrature (Q) outputs of adaptive equalizer 170 and the I and Q values of the nearest constellation point (see constellation diagrams of FIGS. 3 and 4). Resolution of the complex adaptive equalizer 170 output to the nearest constellation point is performed by the slicer 200. The adaptive equalizer 170 coefficients are set to a "good" initial state by the training sequence processor 160, as previously described. The training sequence processor 160 may be subsequently activated to produce a good initial set of equalizer coefficients anytime a "long" or "short" training sequence is received if so directed by an SNR or BER estimation circuit (not shown). During reception of Audio/Video data portions 9 shown in FIG. 1 the adaptive equalizer coefficients are periodically updated by using the slicer 200 decisions as input to the LMS algorithm implemented in coefficient update block 180. The slicer 200 output is sent to I and Q to symbol decoding circuit 240 that converts from I and Q values to a binary word of 2, 4, 5 or 6 bits for 4, 16, 32, or 64 QAM respectively. Differential decoding is then performed by differential decoder 250 to allow decoding with the absolute carrier phase ambiguity of the receiver's carrer recovery loop. The parallel 2–6 bit word is converted to a serial bit stream by parallel to serial converter 260. This serial stream is de-scrambled in descrambler 270 to invert the scrambling performed at the modulator. The resulting bit stream is routed by demultiplexer 280, to the appropriate deinterleaver, FEC decoder, and de-packetizer (300, 320, 340 or 290, 310, 330); depending on whether it is audio or video information.

The alternation sequence detector 150 detects the alternation sequence 3 shown in FIG. 1. The state machine 230 controls the configuration of the detection circuitry (200, 240, 260, 280) to be compatible with the modulation level being received at any given time. When an alternation sequence is detected by detector 150, the state machine 230 configures the slicer 200 for the modulation level used in the "long" and "short" training sequences, typically 4 QAM (aka QPSK). It then configures slicer 200 and I and Q to symbol decoding circuit 240 for the modulation rate used for the rate sequence, typically 4 QAM also. After the rate sequence has been received and decoded, the state machine 230 configures slicer 200, I and Q to symbol decoding circuit 240 and parallel to serial converter 260 for whatever modulation level is specified by the rate sequence. The modulation select output for the state machine 230 is passed to the demultiplexer 280 which then routes audio data to audio decoder 360 via deinterleaver 300, FEC decoder 320 and depacketizer 340, and routes video data to video decoder 350 via deinterleaver 290, FEC decoder 310 and depacketizer 330.

The foregoing disclosure and description of the invention is illustrative and explanatory thereof and various changes in the details of the embodiments shown may be made within the scope of the appended claims without departing from the spirit of the invention.

We claim:

1. A method for transmitting a digital signal, said method comprising the steps of:

forming a plurality of first data portions from a source of first information;

forming a plurality of second data portions from a source of second information;

multiplexing said first and second data portions with a rate sequence on a single carrier to form a multiplexed signal;

modulating said first data portions using a first signal constellation, modulating said second data portions using a second signal constellation, and modulating said rate sequence using a third signal constellation.

2. A method for transmitting a digital signal as claimed in claim 1, wherein said first information is a video signal and said second information is an audio signal.

3. A method for transmitting a digital signal as claimed in claim 1, said method further comprising the steps of:
   multiplexing said multiplexed signal with a training sequence on a single carrier; and
   modulating said training sequence using a fourth signal constellation.

4. A method for transmitting a digital signal as claimed in claim 3, wherein said first information is a video signal and said second information is an audio signal.

5. A method for transmitting a digital signal as claimed in claim 1, said method further comprising the steps of:
   multiplexing said multiplexed signal with an alternation sequence on a single carrier; and
   modulating said alternation sequence using a fourth signal constellation.

6. A method for transmitting a digital signal as claimed in claim 1, said method further comprising the steps of:
   multiplexing said multiplexed signal with a training sequence and an alternation sequence on a single carrier; and
   modulating said training sequence using a fourth signal constellation; and modulating said alternation sequence using a fifth signal constellation.

7. A method for transmitting a digital signal as claimed in claim 6, wherein said first information is a video signal and said second information is an audio signal.

8. A method for transmitting a digital signal as claimed in claim 6, wherein said training sequence is a CAZAC sequence.

9. A method for transmitting a digital signal as claimed in claim 8, wherein said first information is a video signal and said second information is an audio signal.

10. A method for transmitting a digital signal, said method comprising the steps of:
    forming a plurality of first data portions from a source of first information;
    forming a plurality of second data portions from a source of second information;
    multiplexing said first and second data portions with a CAZAC sequence and an alternation sequence;
    modulating said first data portions using a first signal constellation, modulating said second data portions using a second signal constellation, modulating said training sequence using a third signal constellation, and modulating said alternation sequence using a fourth signal constellation.

11. A method for transmitting a digital signal as claimed in claim 10, wherein said first information is a video signal and said second information is an audio signal.

12. An apparatus for transmitting a digital signal, said apparatus comprising:
    means for forming a plurality of first data portions from a source of first information;
    means for forming a plurality of second data portions from a source of second information;
    means for multiplexing said first and second data portions with a rate sequence on a single carrier to form a multiplexed signal;
    means for modulating said first data portions using a first signal constellation, means for modulating said second data portions using a second signal constellation, and means for modulating said rate sequence using a third signal constellation.

13. An apparatus for transmitting a digital signal as claimed in claim 12, wherein said first information is a video signal and said second information is an audio signal.

14. An apparatus for transmitting a digital signal as claimed in claim 12, said apparatus further comprising:
    means for multiplexing said multiplexed signal with a training sequence and an alternation sequence;
    means for modulating said training sequence using a fourth signal constellation, and means for modulating said alternation sequence using a fifth signal constellation.

15. An apparatus for transmitting a digital signal as claimed in claim 14, wherein said first information is a video signal and said second information is an audio signal.

16. An apparatus for transmitting a digital signal as claimed in claim 14, wherein said training sequence is a CAZAC sequence.

17. An apparatus for transmitting a digital signal as claimed in claim 16, wherein said first information is a video signal and said second information is an audio signal.

18. A method for decoding a digital signal, having first and second data portions multiplexed with a rate sequence on a single carrier forming a multiplexed signal, wherein said first data portions are formed from a source of first information and modulated using a first signal constellation, said second data portions are formed from a source of second information and modulated using a second signal constellation, and said rate sequence is modulated using a third signal constellation, said method comprising the steps of:
    receiving said digital signal;
    demodulating said rate sequence and said first and second data portions;
    decoding said first information from said first data portions; and
    decoding said second information from said second data portions.

19. An method for decoding a digital signal as claimed in claim 18, wherein said first information is a video signal and said second information is an audio signal.

20. An apparatus for decoding a digital signal, having first and second data portions multiplexed with a rate sequence on a single carrier forming a multiplexed signal, wherein said first data portions are formed from a source of first information and modulated using a first signal constellation, said second data portions are formed from a source of second information and modulated using a second signal constellation, and said rate sequence is modulated using a third signal constellation, said apparatus comprising:
    means for receiving said digital signal;
    means for demodulating said rate sequence and said first and second data portions;
    means for decoding said first information from said first data portions; and
    means for decoding said second information from said second data portions.

21. An apparatus for decoding a digital signal as claimed in claim 20, wherein said first information is a video signal and said second information is an audio signal.

* * * * *